(12) United States Patent
Saltsov et al.

(10) Patent No.: US 7,071,685 B2
(45) Date of Patent: Jul. 4, 2006

(54) INDUCTION SENSOR USING PRINTED CIRCUIT

(75) Inventors: Leon Saltsov, Thornhill (CA);
Volodymyr Barchuk, Kiev (UA);
Sergiy Androsyuk, Toronto (CA);
Dmitro Baydin, Toronto (CA); Vitaliy Grzhibovskyy, Richmond Hill (CA);
Yevgeniy Yavorskyy, Toronto (CA);
Gennadiy Gaponyuk, Toronto (CA)

(73) Assignee: CashCode Company Inc., Concord (CA)

( * ) Notice: Subject to any disclaimer, the term of this patent is extended or adjusted under 35 U.S.C. 154(b) by 240 days.

(21) Appl. No.: 10/736,503

(22) Filed: Dec. 17, 2003

(65) Prior Publication Data

US 2004/0130318 A1    Jul. 8, 2004

(51) Int. Cl.
*G01N 27/82* (2006.01)

(52) U.S. Cl. .................. 324/240; 194/320; 324/239; 324/242; 324/243

(58) Field of Classification Search ............... 324/228, 324/235–243, 226, 260; 194/320, 302; 336/200; 382/135; 209/534, 567; 340/5.86
See application file for complete search history.

(56) References Cited

U.S. PATENT DOCUMENTS

| 4,253,079 A | 2/1981 | Brosh |
| 4,864,238 A | 9/1989 | Seitz |
| 5,014,006 A * | 5/1991 | Seitz .......................... 324/249 |
| 5,278,500 A * | 1/1994 | Seitz .......................... 324/249 |
| 5,576,224 A | 11/1996 | Yakura et al. |
| 5,614,824 A * | 3/1997 | Dames et al. ............... 324/239 |
| 6,057,683 A * | 5/2000 | Khvostov ................... 324/236 |
| 6,382,386 B1 * | 5/2002 | Gaponyuk et al. .......... 194/318 |
| 2002/0110396 A1 | 8/2002 | Tadashi |

* cited by examiner

*Primary Examiner*—Jay Patidar
*Assistant Examiner*—Tyrone Jackson

(57) ABSTRACT

A planar induction sensor for sensing of security features of documents having changing magnetic and (or) conducting properties is of a multilayer printed circuit board design. The sensor comprises a planar current transformer with a spiral-type primary coils and one or several turns of secondary coil in an adjacent layer of the printed circuit board. The secondary coil of the current transformer is connected to an operating coil, which is situated at a sensing edge of the sensor. The operating coil can be formed by external wires or can be incorporated in the circuit board of the current transformer. When a security element, made from the magnetic or conductive material moves past the sensing edge of the sensor, a change in inductance of the induction sensor occurs. In a preferred embodiment, two induction sensors with individual associated electronic circuits were located on opposite sides of validator channel. Analysis of both signals from the sensors allows correction of the signal to reduce variation caused by changing distance of the security document from each sensor.

51 Claims, 11 Drawing Sheets

INDUCTION SENSOR USING PRINTED CIRCUIT

FIELD OF THE INVENTION

The present invention is directed to an induction sensor for detection of magnetic and conductivity elements passed in proximity to the active part of a planar induction sensor. The planar induction sensor has particular application in verification devices for verifying the authenticity of documents, such as banknotes, that have magnetic or conductive security elements.

BACKGROUND OF THE INVENTION

Many security documents, such as bank notes, include different security elements including security dyes, security inks and security threads. These security elements typically have magnetic and (or) conducting properties which can be detected. Counterfeited documents sometimes have magnetic properties in those regions, where an authentic document has not any magnetic properties and therefore detection of these elements and the location is useful to determine whether a banknote is authentic.

There are various types of induction sensors, which are able to detect magnetic and conductive properties of documents. When a document, having magnetic or conductive properties, is moved past an induction sensor, it causes changes in the inductiveness and magnification factor of the induction sensor as inductance. Electronic circuitry associated with the induction sensor detects changes in the properties of the induction sensors.

Most induction sensors contain ferromagnetic cores for forming a high magnitude magnetic field on the document under test. Magnetic properties of such cores depend on the magnitude of the external magnetic field. When an induction sensor is situated in an external magnetic field with time-varying magnitude the signal from the sensor may be undistinguishable from a signal associated with passing of security document. Wide dispersion of magnetic permeability of ferromagnetic cores leads to wide dispersion of initial inductance of such types of induction sensors. Due to this dispersion complicated electronic circuitry or individual adjusting elements are often required.

In many induction sensors, the exciting coil is made from wire coils, containing many turns on a special former. Such coils and other elements of this type of induction sensors are expensive to manufacture. Induction sensors with such wire coils often have a wide dispersion of inductance, even if the sensors have ferrite cores.

Most induction sensors have a small geometrical vicinity for sensing. In banknote validators using such types of induction sensors special mechanical arrangements are used to hold the banknote in close proximity to or in direct contact with the induction sensor. Such an arrangement leads to a high probability of bill jamming and to high wear of the induction head.

Some induction sensors provide testing of documents without direct contact with the documents due to placement of two inductive parts of the same induction sensor on opposite sides of a validating channel. The main problem with this approach is the two induction parts are connected by relatively long wires which carry a high frequency signal. These wires add a source of interference.

The present invention departs from the accepted approach of using wire coils and ferromagnetic cores as are common in prior art. The present induction sensor can be manufactured using a low cost multilayer printed circuit board technology and provides a narrow dispersion of induction sensor parameters. The present induction sensor can be manufactured with various resolution sensing zone parameters and has particular application in banknote validators and without direct contact of the banknote. Analysis of signals from two such induction sensors with individual associated electronic circuits placed on opposite sides of validator channel reduces variation of the signal as a function of the distance between the sensor and the banknote.

SUMMARY OF THE INVENTION

According to the present invention, a planar induction sensor for sensing magnetic or conductive properties in security documents comprises a planar current transformer with a secondary coil connected to an operating coil. The planar current transformer is manufactured by multilayer printed circuit board technology and comprises spiral type primary coil and secondary coil containing one or several turns in the nearest layer of multilayer circuit board. Operating coil could be incorporated in the same printed board with current transformer, forming fully complete induction sensor. In the other configuration external wires could be used for forming operation coil. Time-varying current in the primary coil of the current transformer induces intensive time-varying current in the secondary coil of current transformer, being directed opposite to the current in primary coil. These current flows in the operating coil which forms testing magnetic field in the nearest vicinity of operating coil. When any magnetic or conductive security element is moved past testing magnetic field, it causes changes in induction's sensors parameters, such as inductance and magnification factor. Associated with induction sensor electronic circuit allows to measure changes in induction sensor parameters.

According to another aspect, a method of improving of the dependence of the sensors signal verses the distance between the sensor and the document includes the arrangement of two planar induction sensors with individual associated electronic circuits placed on the opposite sides of the validator channel. An analysis of the signal from one sensor allows calculating correction coefficients for multiplication the signal from second sensor. It improves the dependence of signal on the distance between the second sensor and the tested document.

Various implementations include one ore more of the following features. The planar induction sensor could comprise several current transformers, each being connected to its own operating coil. The planar induction sensor could comprise several current transformers, connected to common operating coil. The primary coil of current transformer may contain two spiral coils, placed in two nearest to opposite sides of the secondary turn layers. The improved geometry of the primary spiral coil of the current transformer in which variable distance between turns is used, said distance being the larger, the larger length of the turn is. Another type of improved primary spiral coil could be used, having constant distance between turns and variable width of the turns, said width being the larger, the longer turn is. The secondary coil of the current transformer could contain several turns. The operating coil could contain one or several wires situated near sensing edge of the sensor with currents flowing in one direction and forming direction of magnetic testing field being parallel to the plain of the tested document. The operating coil could contain two or several wires situated near sensing edge of the sensor with currents flowing in opposite directions and forming direction of testing magnetic field being perpendicular to the plain of the tested document.

BRIEF DESCRIPTION OF THE DRAWINGS

Preferred embodiments of the invention are shown in the drawings, wherein:

FIG. 1A is an exploded perspective view of the planar induction sensor;

FIG. 1B is a partial sectional view of the induction sensor;

FIG. 1C is a perspective view of the induction sensor;

FIG. 3A is an exploded perspective of a modified planar induction sensor having two series primary coils in different;

FIG. 3B is a partial sectional view of the modified planar induction sensor;

FIG. 3C is a perspective view of the modified planar induction sensor;

DETAILED DESCRIPTION OF THE PREFERRED EMBODIMENTS

Figure 1:
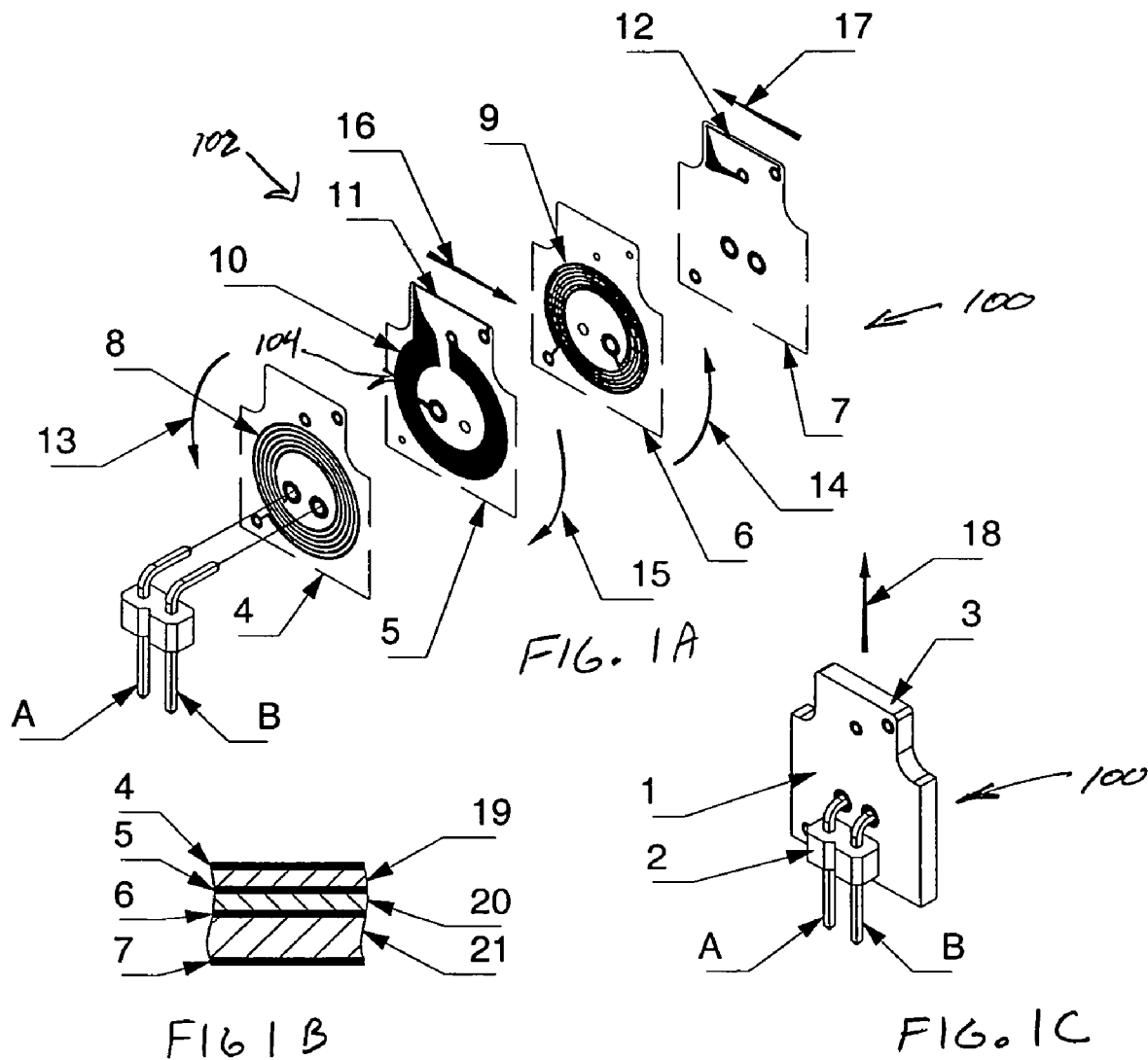
FIG. 1 is a schematic showing the planar induction sensor, comprising the current transformer with two series primary coils in different layers and one-turn secondary coil, being connected to two-wire operating coil.

The planar induction sensor 100 shown on FIG. 1 comprises multilayer printed board 1 and two-wire connector 2. This sensor has active zone situated near edge 3 of the multilayer printed board 1. The multilayer printed board 1 comprises four active layers 4, 5, 6 and 7, said active layers are separated by glass fibre laminat separation dielectric layers 19, 20 and 21. All holes, shown on FIGS. 1A, 1B and 1C have inner metallization allowing connection between the wires in active layers 4, 5, 6 and 7 associated with the corresponding hole.

In active layers 4, 5 and 6 there is situated a current transformer 102 being formed by two series primary spiral-type coils 8 and 9 and a secondary one-turn coil 10. Secondary coil 10 of current transformer is connected to the operating coil 104 being formed by two wires 11 and 12. Wires 11 and 12 of the operating coil are situated in the nearest vicinity to sensing edge 3 of multilayer printed board 1.

Instant directions of alternating currents in series primary coils 8 and 9 of the current transformer are shown by arrows 13 and 14, respectively. Alternating magnetic fields from these currents in the primary coils generate magnified like-directed currents on both sides of the secondary one-turn coil of the current transformer with instant direction is shown by arrow 15. This is the case when the thickness of the secondary coil material is at least one skin layer for the material of the secondary coil at the operating frequency of the induction sensor. Skin layer thickness is a function of the frequency and conductance of the material, and is smaller as the operating the higher operating frequency increases and the conductance of the material decreases. For copper, the most commonly used material in printed circuit board technology, at 10 MHz operating frequency the thickness of skin layer is about 25 μm. These calculations should be taken into consideration in determining the low limit for the operating frequency of the induction sensor. Thin separating layers 37 and 38 should be used for improving efficiency of the current transformer. Standard separation layers with 0.1 mm thickens could be used for this purpose. The secondary coil of the current transformer is connected to the operating coil, which is formed by two wires 11 and 12. The operating coil contains two wires 11 and 12 with connection to the secondary coil 10 arranged such that the current flows in opposite directions as shown in FIG. 1 by arrows 16 and 17. Wires 11 and 12 of the operating coil are situated in the nearest vicinity to sensing edge 3 of the induction sensor. The distance between wires 11 and 12 is determined by the sum of the thicknesses of separation layers 20 and 21. Instant direction of testing magnetic field, formed by the operating coil is shown by arrow 18. The direction of testing magnetic field lies in the plane of the printed circuit board 1, being perpendicular to sensing edge 3 of the induction sensor.

Several factors should be taken into account, when choosing the separation distance between wires 11 and 12 of operating coil. The higher the magnitude of the testing magnetic field, the greater is the relative change in inductance of the sensor when a magnetic or conductive security element of a tested document passes the vicinity of sensing edge 3. This relative change in inductance characterizes the sensitivity of an induction sensor. The magnitude of the testing magnetic field in the nearest vicinity of sensing edge 3 increases as distance between wires 11 and 12 of the operating coil decreases. On the other hand, as the distance between wires 11 and 12 decreases, the active vicinity of sensing edge 3 decreases and the distance between sensing edge 3 of the induction sensor and the document decreases. This improves detection of security elements. The sensor that resolution of separated security elements on a test document also depends on the distance between wires 11 and 12. The resolution of the sensor increases as the distance between wires 11 and 12 decreases. Also, if security elements are closely spaced on a banknote, close spacing of the wires is required. Therefore, the distance between wires 11 and 12 depends on the particular application. Particularly, the sensor, shown on the FIG. 1, with 1.5 mm separation distance between wires 11 and 12 is able to detect magnetic inks on the US banknotes with a resolution about 2 mm if the distance between sensing edge 3 of the sensor and tested bill is less then 1.5 mm. This sensor could be used in banknote validators without direct contact with the bill and is able to detect security elements in spite of wobble of the banknote.

As shown in FIG. 1, the operating coil of the induction sensor and the secondary coil of current transformer are connected with one end of the primary coil of current transformer. This connection is necessary to decrease capacitance type sensitivity of induction sensor. Such sensitivity arises, when large frequency voltage is present on elements of the sensor, being nearest to the sensing edge of the sensor. In this case the banknote and its conductive elements can influence the capacitance between these elements and the other group of elements, including the elements of the induction sensor and elements of associated electronic circuitry. Such type of influence leads to the signals from associated circuitry, being undistinguishable from the signals, associated with magnetic security elements of the banknote. The connection of the operating coil to the end of the primary coil makes wires A and B of induction sensor connector 2 nonequivalent. Wire A should be connected to the common wire of associated electronic circuit. There is another possibility which provides more abilities in associated electronic circuit design where the operating coil does not have any connection with the primary coil of the current transformer. The operating coil is connected to the common wire individually. In the case, when there must not be any DC coupling between the operating coil and the primary coil of current transformer an AC connection through the capacitor should be used.

Figure 2:
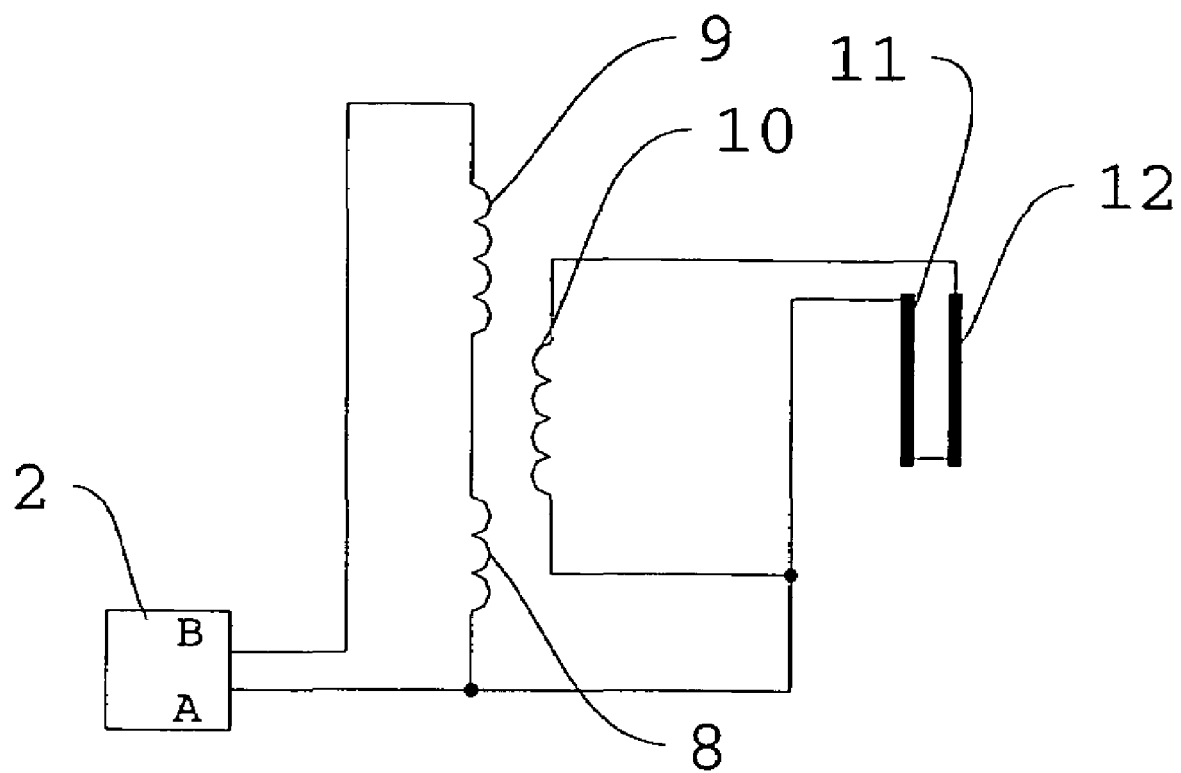
FIG. 2 is a circuit diagram of the planar induction sensor, shown on FIG. 1.

FIG. 2 shows an equivalent electronic circuit of the induction sensor with the construction, shown on the FIG. 1. The primary coil of the current transformer consists of two series coils 8 and 9, connected to the connector 2 of the induction sensor. Secondary coil 10 of the current transformer is connected to the operating coil, formed by the wires 11 and 12. The operating coil has connection with one end of the currents transformer primary coil and pin A of the sensors connector 2.

All elements of the planar induction sensor, including connector 2, are made from nonmagnetic material to avoid the influence of external magnetic fields on the sensor. Any ferromagnetic material has dependence of magnetic permeability on the magnitude of external magnetic field. Application of such materials in induction sensor construction leads to dependence of sensors inductance on the magnitude of the external magnetic field. Such influence is undesirable, when the external magnetic field is time-varying. Such fields can induce a time-varying signal from the associated circuitry, in many cases being undistinguishable from that, induced by security elements of documents.

The operating frequency range of the planar induction sensor, shown in FIG. 1, is from several megahertz to several tenths of a megahertz. The lower limit is defined by efficiency of the current transformer operation. The upper limit is not exactly defined, but can be estimated as a possible resonant frequency of the sensor configuration.

Conductive materials, used in planar induction sensor, should be with the minimum possible specific resistance. This requirement is useful for the decreasing of the lower limit of operating frequency range and improves magnification factor of the induction sensor inductance. For the same reason printed circuit board materials with thick metal layers should be used. As far as such material with low specific resistance as copper is used in usual printed board technology, it is easy to meet this requirement. Another materials with low specific resistance, such as aluminum or silver, could be used in construction of induction sensors.

A variant of the planar induction sensor, shown in FIG. 1 is possible by deleting spiral coil 9 and only using spiral coil 8. The current transformer of such a construction is not optimal for high frequency operation, but a sensor with a such current transformer has a lower frequency low limit.

Figure 3:
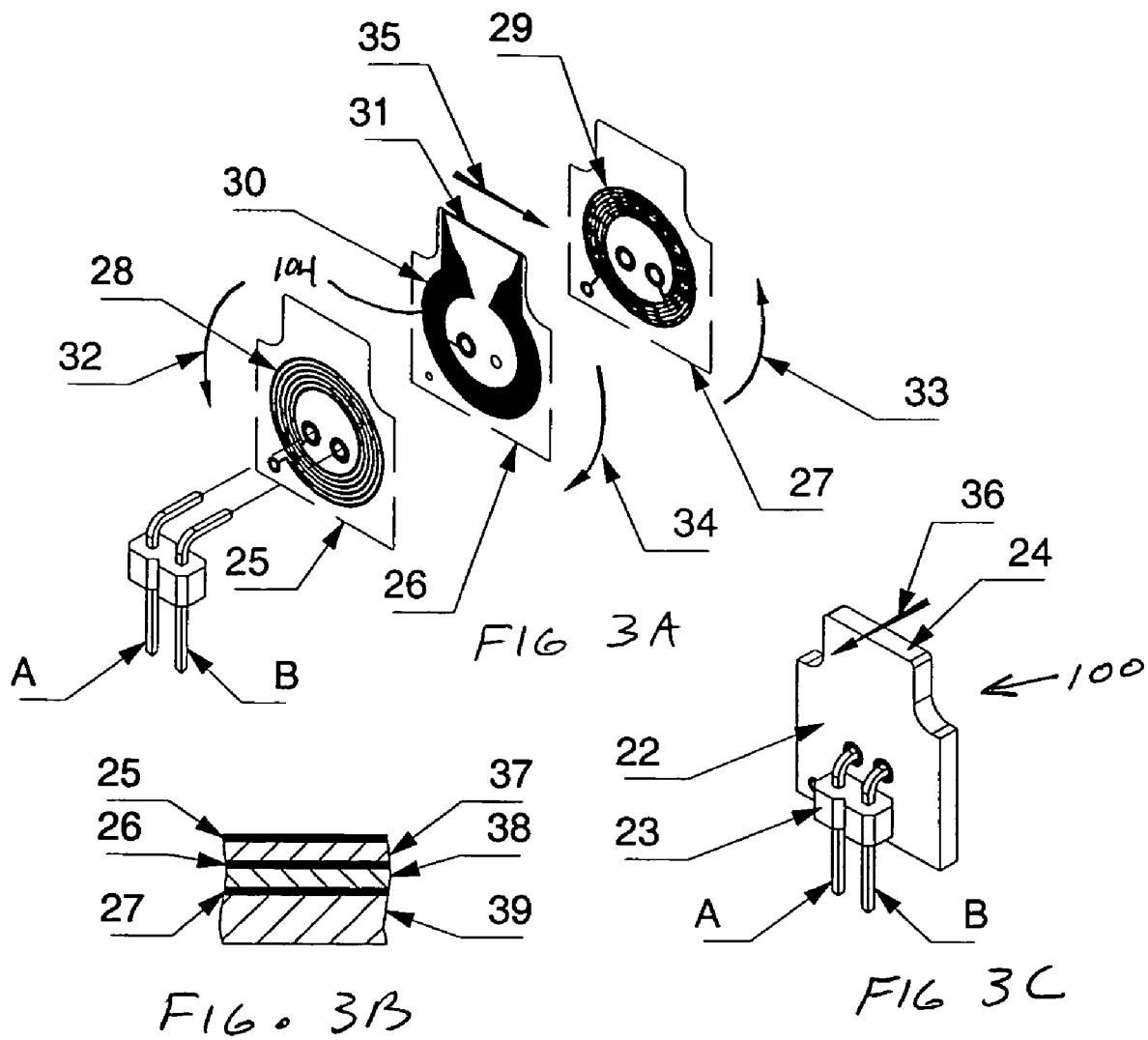
FIG. 3 is a schematic, showing the construction of planar induction sensor, comprising the current transformer with two series primary coils in different layers and a one-turn secondary coil, being connected to one-wire operating coil.

FIG. 3 shows another type of the induction sensor, which differs from that, shown on the FIG. 1 only by construction of the operating coil. The sensor operates in a similar manner with the exception of the operating coil and the direction of testing magnetic field. This sensor comprises a multilayer printed circuit board 22 with two-wire connector 23. The multilayer printed circuit board has three active layers 25, 26 and 27, mounted on the dielectric substrate 39 and being separated by dielectric layers 37 and 38. The current transformer comprises two series spiral-type primary coils 28 and 22 and one-turn secondary coil 30, being situated in active layers 25, 26 and 27, correspondingly. Instant directions of currents in the coils of the current transformer are shown by arrows 32, 34 and 33. The main distinction of the sensor, shown in FIG. 3 from the sensor of FIG. 1, is the operation coil, being formed by one wire 31. The wire is situated near the sensing edge 24 of the induction sensor. Instantaneous current direction in this wire is shown by the arrow 35. This current induces a testing magnetic field which direction in the nearest vicinity of sensing edge 24 of the sensor, is shown by the arrow 36. This testing magnetic field direction is perpendicular to the sensors printed circuit board 22 plane and lies in the plane of the tested document. Such a sensor has sensitivity dependence on the distance from sensing edge to the tested document and as such, is less precise relative to the sensor of FIG. 1.

Figure 4:
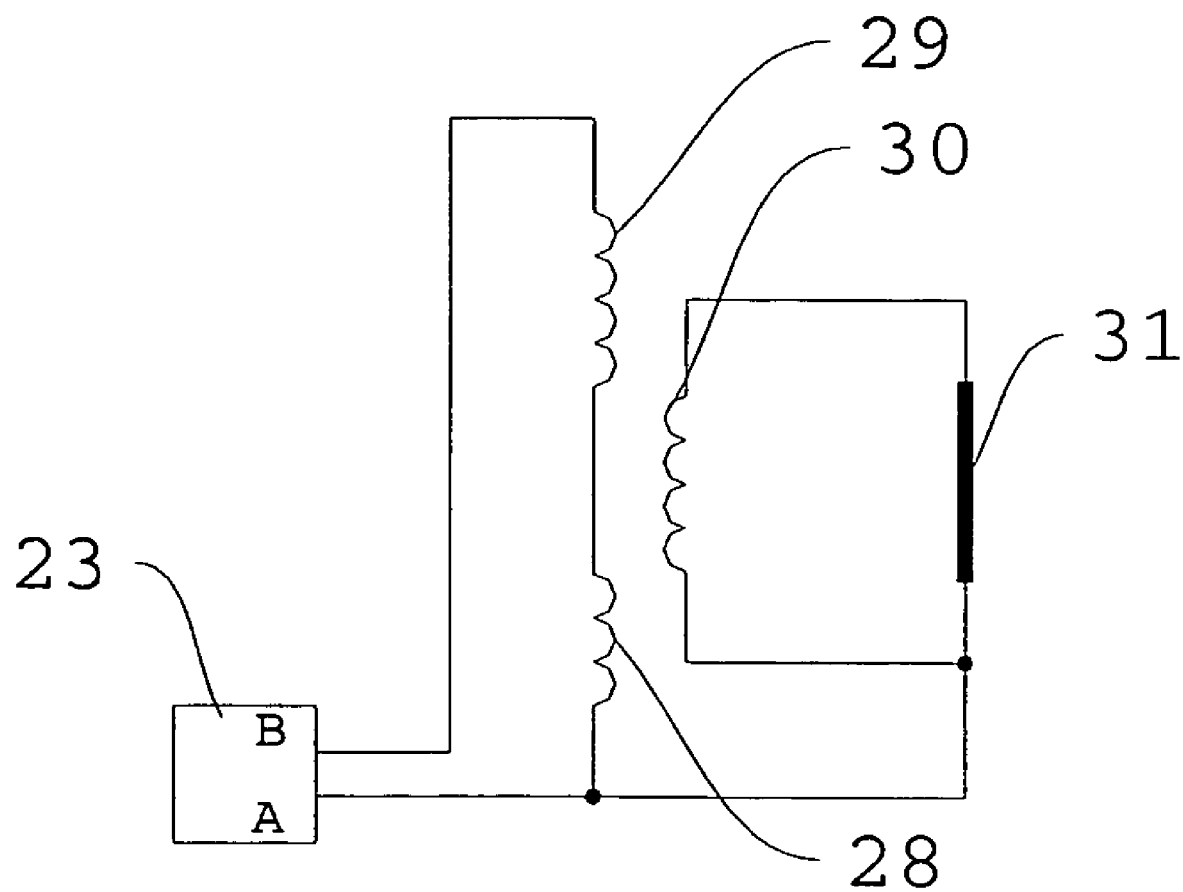
FIG. 4 is a circuit diagram of the planar induction sensor, shown on FIG. 3.

FIG. 4 shows equivalent electronic circuit of the induction sensor of the construction, shown in FIG. 3. All unit numbers on FIG. 4 correspond to that, shown on the FIG. 3. The primary coil of the current transformer consists of two series coils 28 and 29, connected to connector 23 of the induction sensor. Secondary coil 30 of the current transformer is connected to the operating coil, formed by wire 31. The operating coil is connected with one end of the current is transformer primary coil and pin A of sensors connector 23.

Figure 5:
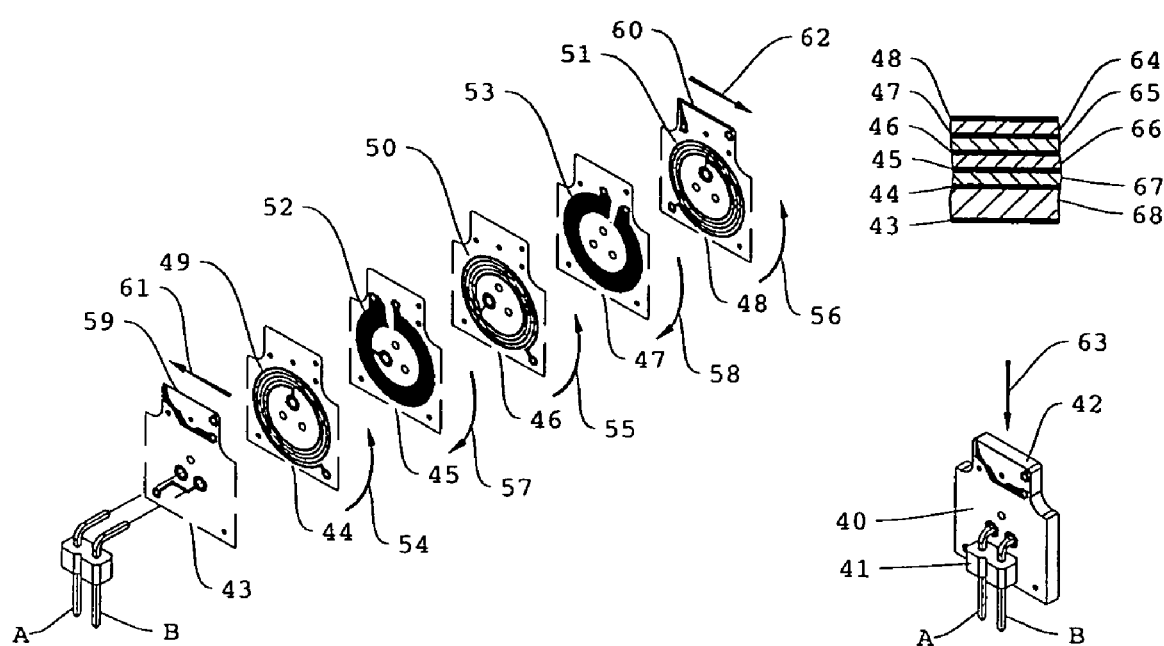
FIG. 5 is a schematic, showing the preferred construction of the planar induction sensor, comprising the current transformer with three series primary coils in different layers and two-turn secondary coil, being connected to two-wire operating coil.

FIG. 5 shows another type of induction sensor with more complicated structure of the current transformer. The sensor comprises a multilayer printed board 40 and two-wire connector 41. All holes, shown on FIG. 5, have inner metallization for connection between the wires in active layers 43, 44, 45, 46, 47 and 48 associated with the corresponding hole. This sensor has an active zone situated near the edge 42 of the multilayer printed board 40. This sensor is similar to the sensor of FIG. 1 and differs from it due to the improved construction of the current transformer. The current transformer in this case contains three primary coils 49, 50 and 51 in different layers 44, 46 and 48. All this primary coils are connected in series. Arrows 54, 55 and 56 shows the instant directions of currents in these primary coils. Secondary coil of the current transformer is situated in layers 45 and 47 of printed circuit board and contains two turns 52 and 53, being connected in series. Operating coil of this sensor is formed near the sensing edge 42 of the printed circuit board 40 by the wires 60 and 61 in the layers 43 and 48. These wires are connected in series to the current transformer. Instant currents in the wires of operating coil have opposite directions, shown by the arrows 61 and 62. The instant direction of testing magnetic field, induced by the operating coil, is shown by the arrow 63 and lies in the plain of the printed circuit board 40 and is perpendicular to the sensing edge 42. All active layers 43, 44, 45 46, 47 and 48 are separated by glass fibre laminat separation dielectric layers 64, 65, 66, 67 and 68. Thickness of the layers 64, 65, 66 and 67 should be as thin as practical for the effective operation of current transformer. The distance between wires 59 and 60 is determined by the sum of the thicknesses of separation layers 64, 65, 66, 67 and 68.

Figure 6:
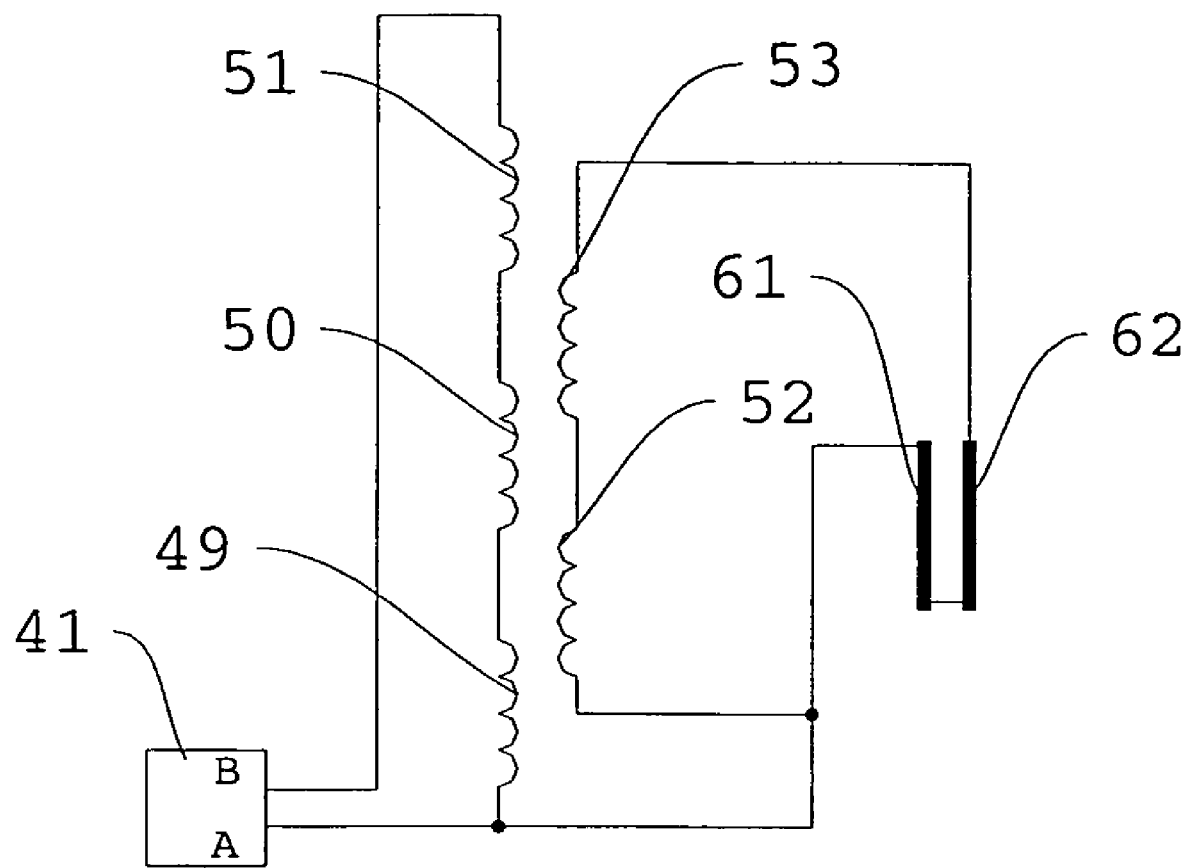
FIG. 6 is a circuit diagram of the planar induction sensor, shown on FIG. 5.

FIG. 6 shows an equivalent electronic circuit of the induction sensor with the construction, shown on the FIG. 5. The primary coil of the current transformer has three series coils 49, 50 and 51, connected to the connector 41 of the induction sensor. Secondary coil of the current transformer consists from two series one-turn coils 52 and 53 being connected to the operating coil. The operating coil contains two series wires 61 and 62.

Figure 7:
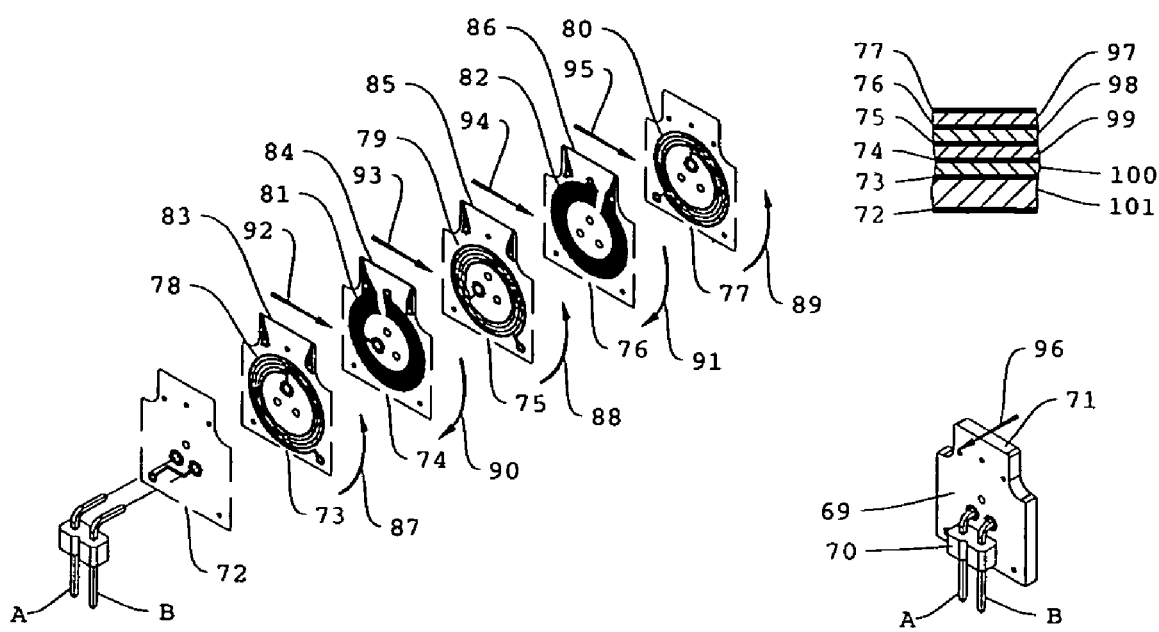
FIG. 7 is a schematic, showing a further construction of planar induction sensor, comprising the current transformer with three series primary coils in different layers and a two-turn secondary coil, being connected to one-wire type operating coil containing fore parallel wires in different layers.

FIG. 7 shows another type of induction sensor with the current transformer, similar to that, shown in FIG. 5. This sensor comprises multilayer printed board 69 and two-wire connector 70. All holes, shown on FIG. 7, have inner metallization for connection between the wires in active layers 72, 73, 74, 75, 76 and 77 are associated with the corresponding hole. This sensor has an active zone situated near the edge 71 of the multilayer printed board 69. The sensor is similar to that, shown in FIG. 3 while having an improved construction of the current transformer and operating coil. The current transformer contains three primary coils 78, 79 and 80 in different layers 73, 75, and 77. All of the primary coils are connected in series. Arrows 87, 88 and 89 shows the instant directions of currents in the primary coils. Secondary coil of the current transformer is situated in layers 74 and 76 of printed circuit board and contains two turns 81 and 82, connected in series. The operating coil of this sensor is formed near the sensing edge 71 of the printed circuit board 69 by the wires 83, 84, 85 and 86 in the layers 73, 74, 75 and 76. These wires are connected in parallel to the current transformer. Instant currents in the wires of the operating coil have the directions shown by the arrows 92, 93, 94 and 95. The instant direction of testing magnetic field, induced by the operating coil, is shown by the arrow 96 and is perpendicular to the plane of the printed circuit board 69 and parallel to the sensing edge 71. All active layers 72, 73, 74, 75, 76 and 77 are separated by glass fibre separation dielectric layers 97, 98, 99, 100 and 101. Thickness of the layers 97, 98, 99 and 100 should be as thin as practical for the effective operation of current transformer. Thickness of the layer 101 is not important.

Figure 8:
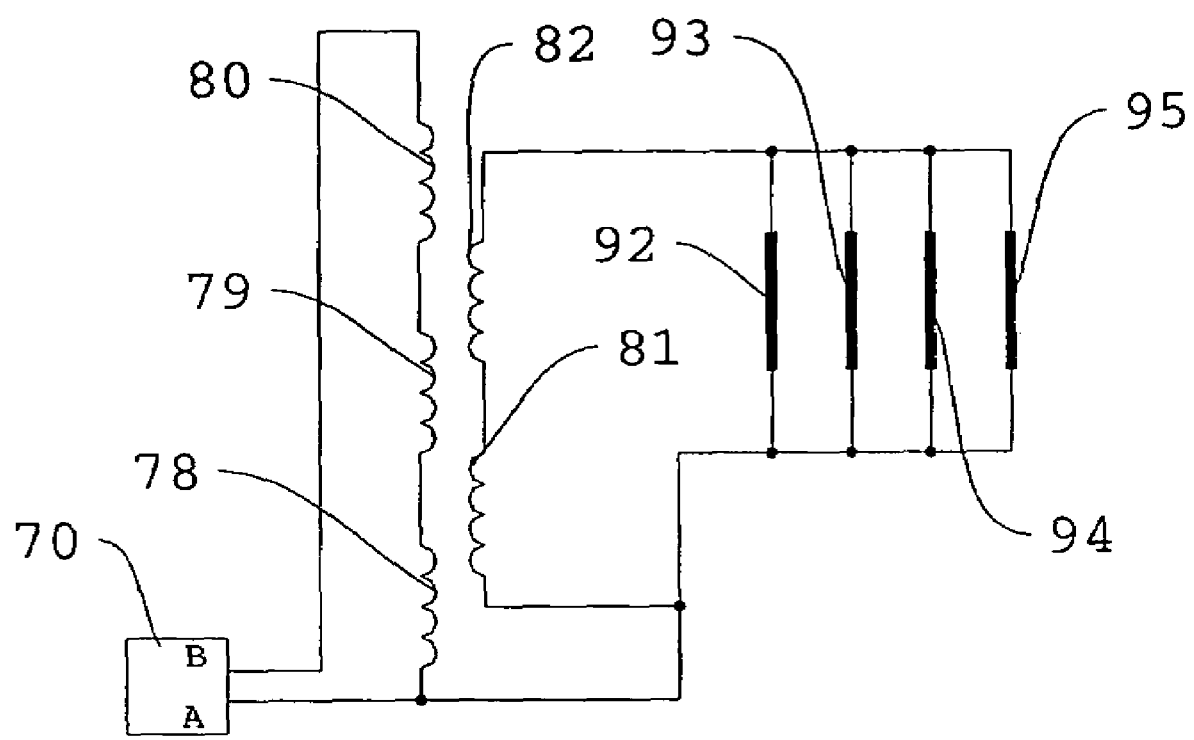
FIG. 8 is a circuit diagram of the planar induction sensor, shown on FIG. 7.

FIG. 8 shows an equivalent electronic circuit of the induction sensor with the construction, as shown in FIG. 7. The primary coil of the current transformer has three series coils 78, 79 and 80, connected to the connector 70 of the induction sensor. The secondary coil of the current transformer has at least series one-turn coils 81 and 82 connected to the operating coil. The operating coil contains four wires 83, 84, 85 and 86 connected in parallel.

The main task of the induction sensors design is to concentrate the magnetic field energy near the sensing edge of the induction sensor. Any magnetic fields in the other parts of the sensor should be minimized. Application of this demand to the sensors, shown on FIGS. 1, 3, 5 and 6, means the minimization of the magnetic field in the vicinity of current transformer. It is seen from the FIGS. 1, 3, 5 and 6, that currents in the primary and secondary coils of the current transformer have opposite directions. This fact leads to the compensation of magnetic fields, associated with these currents, in the vicinity of the current transformer. The efficiency of the current transformer depends on the thickness of the separation layers, wires material properties and its thickness and the chosen operation frequency. There are also several geometry aspects, influencing the quality of the current transformer. All of the secondary coil should be covered by primary coils. Current in any part of the secondary coil without exciting turns of primary coil in the nearest vicinity will induce uncompensated magnetic field in its vicinity. The currency transformer can be further improved by the correct geometry of primary coil of current transformer.

Figure 9:
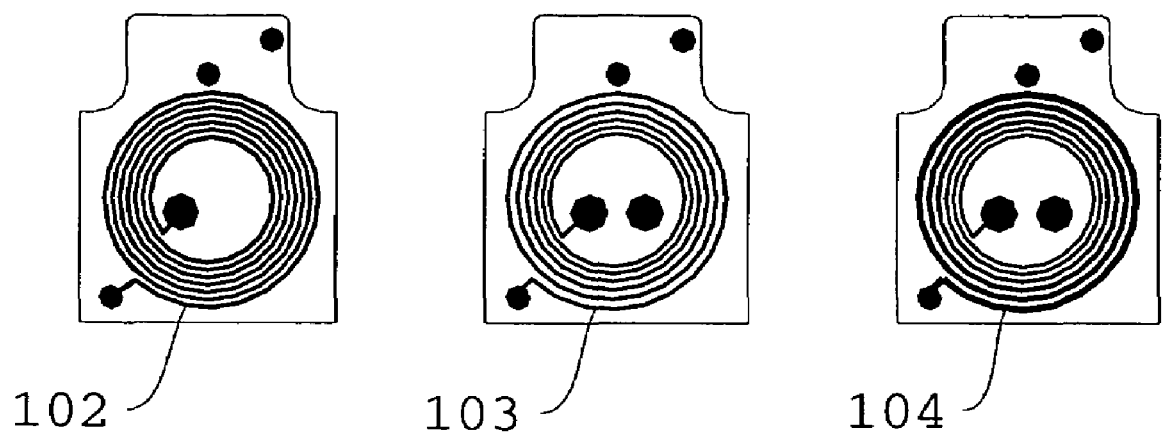
FIG. 9 is a schematic, showing three variants of primary coils of the current transformer.

FIG. 9 shows three types of primary coils of the current transformer. Spiral-type coil 102 has constant width of turns and constant distance between turns, For complete compensation of magnetic field induced by the current in this type of coil, a uniform distribution of current density in the secondary coil of the current transformer is required. Such current distribution is not possible as it implies different magnitude of voltages on the secondary coil ends, caused by the currents on the inner and outer edges of secondary coil. For this reason, compensation for coil 102 will only be achieved in the region of the middle turns of the coil. Application of such a coil is justified in the case of a current transformer configuration, when the lengths of inner and outer turns differ slightly. Configuration of spiral-type coils 103 and 104, shown in the FIG. 9, allow complete compensation in all vicinities of the current transformer. Coil 103 has constant width of the turns with variable distance between turns, being greater as the length of the turn increases. Coil 104 has constant separation distance between turns with variable width of the turns, being the greater, as the length of turns increases. Variable parameters for coils 103 and 104 are so, that excited current distribution in secondary coil of current transformer is optimal for this coil.

There are known electronic circuits for processing signals from induction sensors. The electronic circuits convert changes in inductance of the induction sensor in available signals, such as proportional to changes in voltage or alternating voltage with frequency, depending on this changes. Such circuitry can be placed on the printed circuit board of induction sensor, forming a fully integrated magnetic channel. It is also possible to place of the associated electronic circuit is placed on printed circuit board.

Figure 10:
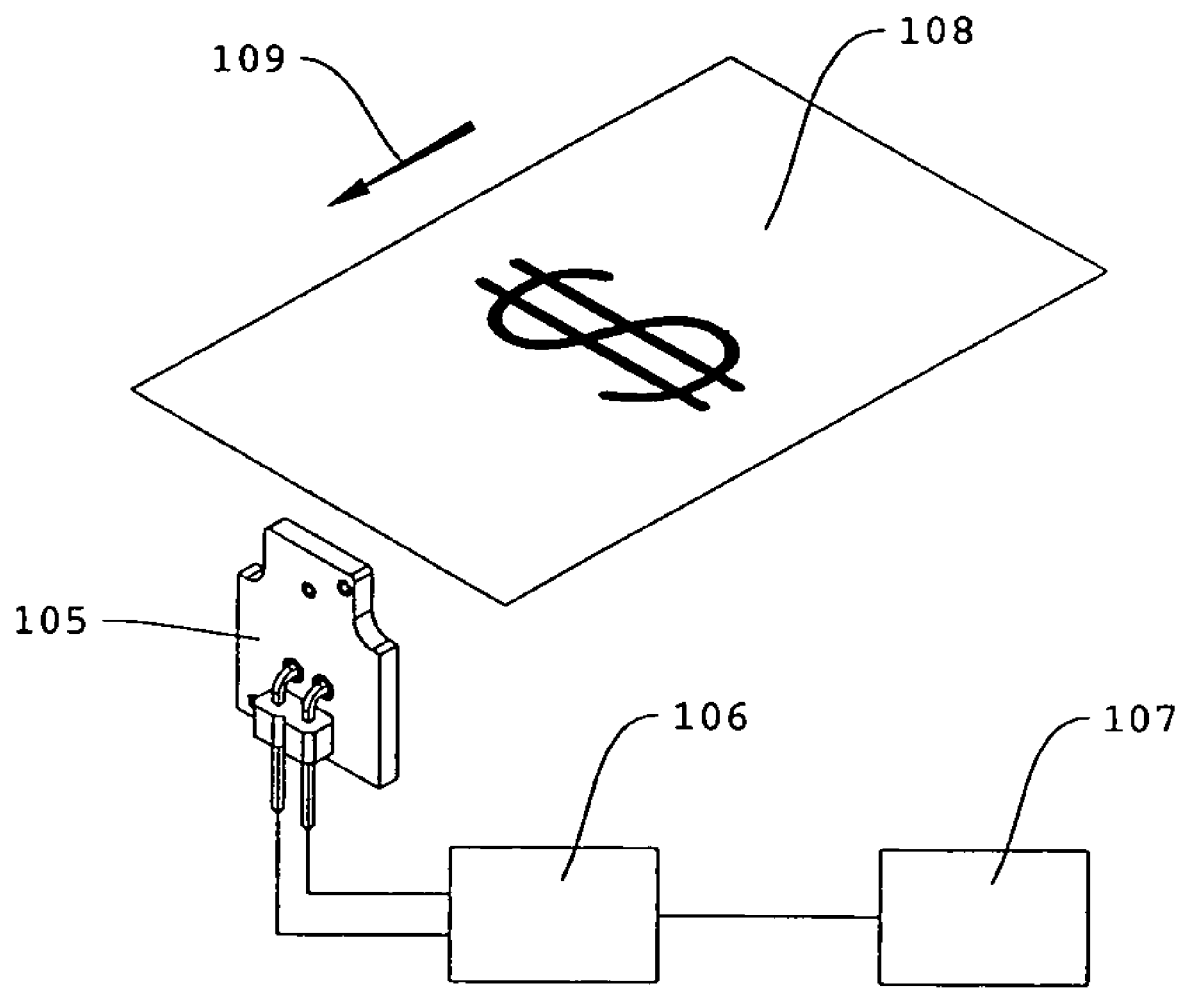
FIG. 10 is a perspective view of a one-side application of planar induction sensor.

FIG. 10 shows a one-side application of planar induction sensor in a bill validator. In this application induction sensor 105 is disposed on one side of a plane of movement of the bill. The plane of the induction sensor printed circuit board is perpendicular to the plane of the tested bill 108. Induction sensor sensing edge is situated in the nearest vicinity of the path that the bill 108 will make along. The direction of movement of bill 108 is shown by the arrow 109. Electronic circuit 106 forms the signal as a function of changes in inductance of induction sensor 105. Analyzing of this signal is completed by microcontroller 107. The one side application as shown in FIG. 10, analyzes only one track of the bill. If it is necessary, several induction sensors can be placed near the bill path to analyze different tracks of the bill. In the case of the planar induction sensors application, multiple sensors can be formed in one printed circuit board. All associated electronic circuitries can also be placed on the printed board, forming complete multi-channel magnetic sensors assembly.

The main disadvantage of the one-side application, shown in FIG. 10, is the signals magnitude depends upon the distance from the bill to the induction sensor. If mechanical arrangements for keeping the bill at a constant distance from the sensor are not used, only presence or absence of a security element are detected and such features of security elements as magnetic and conductive properties can only estimated.

Figure 11:
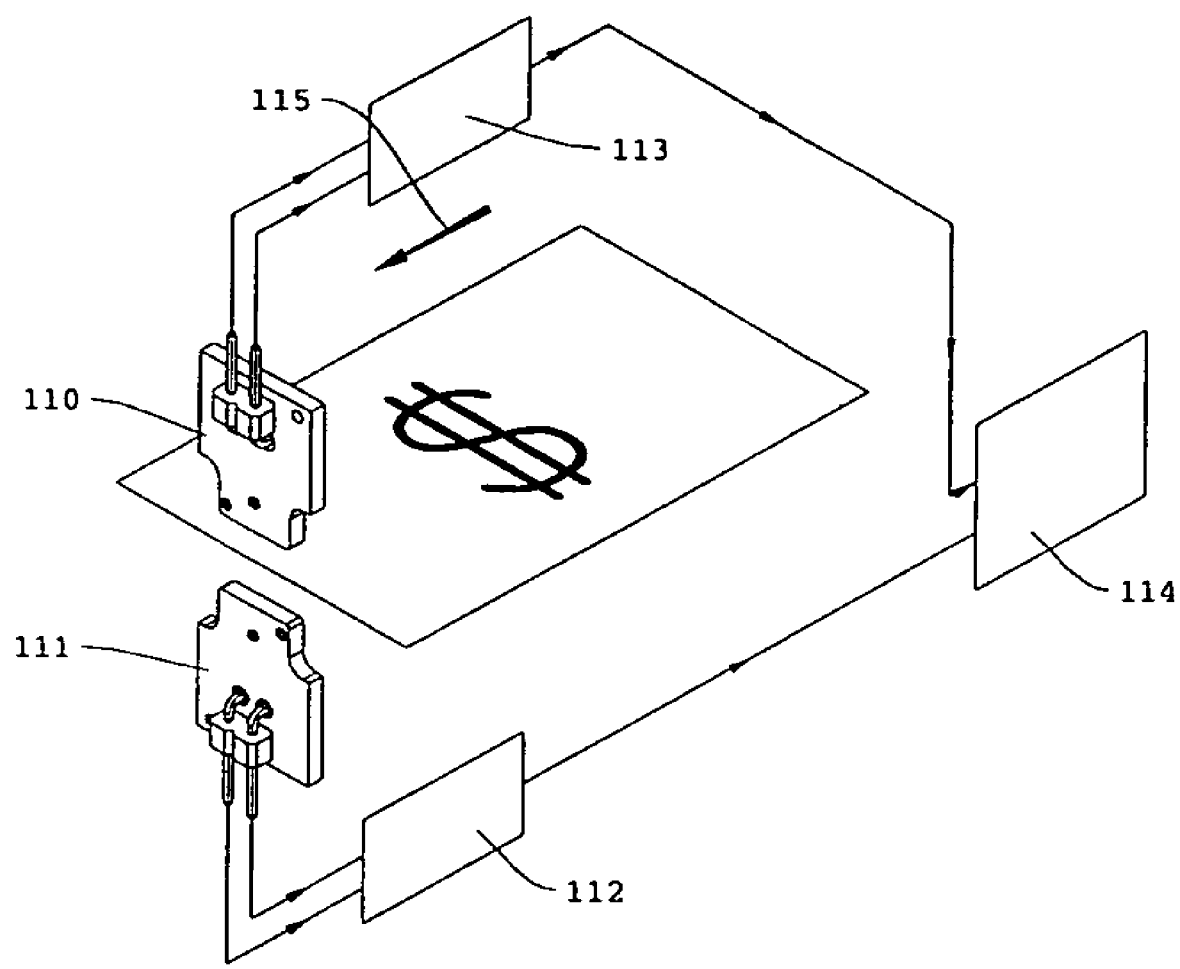
FIG. 11 is a perspective view of the planar induction sensors assembly for improving magnitude dependence of the signal from the circuitry, associated with planar induction sensor, on the distance from the sensor to the tested document.

FIG. 11 shows the arrangement of a planar induction sensor, which takes into account dependence of the signals on the distance from the sensor to the bill even in the case of document wobble in the validator channel. This arrangement comprises two planar induction sensors 110 and 111 with individual associated electronic circuit 112 and 113, placed on opposite sides of the validator channel directly opposite one another. Signals from both sensors are analyzed by microcontroller 114. Bills movement direction is shown by the arrow 115. If the distance between sensors 110 and 111 and individual sensitivities of each of the sensors is known, the instantaneous ratio between magnitudes of the signals from each sensor characterizes the position of the tested security element between the sensors at the same instant. Information about position along with known function dependence of the signal on the distance from the sensor to the tested security element allows calculation of the real amplitude of the signal despite any wobble of the bill in the channel of the validator. This complex procedure with many terms is simplified due to the high extent of reproducibility of the printed board technology of main parameters of planar induction sensors, such as sensitivity and function of dependence of the sensitivity on the distance from sensor to tested security element.

Although various preferred embodiments of the present invention have been described herein in detail, it will be appreciated by those skilled in the art, that variations may be made thereto without departing from the spirit of the invention or the scope of the appended claims.

The invention claimed is:

1. A banknote validator comprising a banknote evaluation channel, a transport arrangement for moving a banknote through said evaluation channel, at least one induction sensor placed in one side of said evaluation channel for sensing changes of the magnetic and inductive properties of a banknote as it is moved past said at least one induction sensor; wherein each induction sensor comprises a multi layered printed circuit and a sensing element, said printed circuit including a first layer having a primary coil thereon and a second layer having a secondary coil thereon, said primary coil being located in overlapping relation with said secondary coil to induce a responsive current in said secondary coil, said sensing element being electrically connected with said secondary coil to form a closed loop therewith, said sensing element concentrating the responsive current of said secondary coil and rendering the sensing element responsive to changes in inductance and conductivity caused by changes in magnetic or inductive properties of a banknote as it is moved past said sensing element.

2. A bank validator as claimed in claim 1 wherein said sensing element of each induction sensor is adjacent an edge of said sensor and includes first and second overlapping elongate conductor portions connected in series and defining a measuring gap therebetween which is sensitive to changes in inductance and capacitance which occur adjacent said edge.

3. A banknote validator as claimed in claim 2 wherein said sensing element of each induction sensor is part of said printed circuit.

4. A banknote validator as claimed in claim 3 wherein said first elongate conductor portions of each induction sensor is provided on one layer of said printed circuit and said second elongate conductor portions is provided on a different layer of said printed circuit.

5. A banknote validator as claimed in claim 4 wherein said secondary coil of each induction sensor is a one turn coil.

6. A banknote validator as claimed in claim 5 wherein said one turn of said secondary coil of each induction sensor is of a wide width to generally overlap with said primary coil.

7. A banknote validator as claimed in claim 1 wherein said sensing element of each induction sensor includes two primary coils located in different layers of said printed circuit.

8. A banknote validator as claimed in claim 7 wherein said primary coils of each induction sensor are separated by the layer containing said secondary coil.

9. A banknote validator as claimed in claim 1 wherein said sensing element of each induction sensor is defined by external conductors connected to said secondary coil.

10. A banknote validator as claimed in claim 1 in combination with a second induction sensor of the same structure and wherein said sensors are provided in a common printed circuit.

11. A banknote validator as claimed in claim 1 wherein each induction sensor includes associated electronic processing circuitry mounted on the multilayered printed circuit board.

12. A banknote validator as claimed in claim 1 wherein several induction sensors and associated electronic circuits are incorporated on one printed circuit board.

13. A banknote validator as claimed in claim 1 having at least two induction sensors with one induction sensor located on one side of the banknote evaluation channel and said second induction sensor located on the opposite side of the evaluation channel.

14. A banknote validator as claimed in claim 13 wherein each of said induction sensors have separate electronic circuitry for processing the signals thereof.

15. A banknote validator comprising a banknote evaluation channel, a transport arrangement for moving a banknote through said evaluation channel, at least one induction sensor placed in one side of said evaluation channel for sensing changes of the magnetic and inductive properties of a banknote as it is moved past said at least one induction sensor wherein said induction sensor comprises a multilayered printed circuit having a current transformer and an operating coil, said current transformer comprising a planar spiral-type primary coil provided on one layer of said printed circuit with an associated secondary coil in an adjacent layer of the printed circuit board, said primary coil cooperating with said secondary coil to induce a responsive intensive current in said secondary coil, said secondary coil being connected to the operating coil, said operating coil forming a testing magnetic field responsive to changes in magnetic and conductive properties of a banknote when moved past said operating coil.

16. A banknote validator as claimed in claim 15 wherein said current transformer and operating coil are situated on the same multilayer printed circuit board and the operating coil is formed by the printed conductors on of said multilayer printed circuit board.

17. A banknote validator as claimed in claim 15 wherein said current transformer contains one primary coil and one secondary coil situated on adjacent layers of the multilayer printed board.

18. A banknote validator as claimed in claim 15 wherein said current transformer comprises two series primary coils in different layers of said circuit board separated by a layer containing said secondary coil of current transformer.

19. A banknote validator as claimed in claim 15 wherein said current transformer comprises two connected in parallel primary coils in different layers of said printed circuit separated by the layer containing said secondary.

20. A banknote validator as claimed in claim 15 wherein said current transformer has a primary coil with a constant width of turns and constant distance between the turns.

21. A banknote validator as claimed in claim 15 wherein said current transformer has a primary coil with a constant width of turns and a variable distance between the turns, said distance increasing with increasing of the length of said turns.

22. A banknote validator as claimed in claim 15 wherein said current transformer has a primary coil with a constant distance between turns and a variable width of the turns, said width increasing with increasing of the length of said turns.

23. A banknote validator as claimed in claim 15 wherein said operating coil contains two or more wires with different directions of currents.

24. A banknote validator as claimed in claim 15 wherein one point of said operating coil is connected to one end of the primary coil of the current transformer.

25. A banknote validator as claimed in claim 15 wherein each induction sensor contains several current transformers, each being connected to an individual operating coil.

26. In a banknote validator, a planar induction sensor for sensing magnetic and conductive security structures as processed by the banknote validator, said planar induction sensor comprising planar current transformers manufactured by multilayer printed circuit board technology and operating coils, said current transformers comprising planar spiral-type primary coils associated with a planar secondary coils in the nearest layers of the printed circuit board, said primary coils induce a responsive intensive current in said secondary coils, said secondary coils being connected to the operating coils, said operating coils forming a testing magnetic field on the magnetic and conductive security structures.

27. In a banknote validator as claimed in claim 26 wherein said current transformers are manufactured by multilayer printed circuit board technology and said operating coils are formed by external wires.

28. In a banknote validator as claimed in claim 26 wherein said current transformers and operating coils are situated on the same multilayer printed circuit board and the operating coils are formed by the printed wires of said multilayer printed circuit board.

29. In a banknote validator as claimed in claim 26 wherein said current transformer contains one primary coil and one secondary coil being situated in nearest layers of the multilayer printed board.

30. In a banknote validator as claimed in claim 26 wherein said current transformer comprises two series primary coils in different layers, separated by the layers in which the secondary coil of current transformer are located.

31. In a banknote validator as claimed in claim 26 wherein said current transformer comprises two conducted in parallel primary coils in different layers, separated by the layers in which the secondary coils of the current transformer are situated.

32. In a banknote validator as claimed in claim 26 wherein said current transformer comprises more than two conducted in serial primary coils in different layers, separated by the layers in which the secondary coils of the current transformer are situated.

33. In a banknote validator as claimed in claim 26 wherein said current transformer comprises more then two conducted in serial-parallel primary coils in different layers, separated by the layers in which the secondary coils of the current transformer are situated.

34. In a banknote validator as claimed in claim 26 wherein said current transformer comprises two or more primary coils with individual exit pins.

35. In a banknote validator as claimed in claim 26 wherein said current transformer includes one-turn secondary coil in one layer of said printed circuit board.

36. In a banknote validator as claimed in claim 26 wherein said current transformer includes two or more turns of secondary coil in one layer of said printed circuit board.

37. In a banknote validator as claimed in claim 26 wherein said current transformer comprises two conducted in serial secondary coils in different layers, separated by the layers in which the primary coils of the current transformer are situated.

38. In a banknote validator as claimed in claim 30 wherein said current transformer comprises two conducted in parallel secondary coils in different layers, separated by the layers in which the primary coils of the current transformer are situated.

39. In a banknote validator as claimed in claim 26 wherein said current transformer comprises more than two secondary coils in the different layers conducted in serial-parallel and separated by the layers in which the primary coils of the current transformer are situated.

40. In a banknote validator as claimed in claim 26 wherein said current transformer has a primary coil with a constant width of turns and constant distance between the turns.

41. In a banknote validator as claimed in claim 26 wherein said current transformer has a primary coil with a constant width of turns and a variable distance between the turns, said distance increasing as the length of said turns increases.

42. In a banknote validator as claimed in claim 26 wherein said current transformer has a primary coil with a constant distance between turns and a variable width of the turns, said width increasing as the length of said turns increases.

43. In a banknote validator as claimed in claim 26 wherein said operating coil contains one wire.

44. In a banknote validator as claimed in claim 26 wherein said operating coil contains several wires where currents flow in the same direction.

45. A banknote validator as claimed in claim 26 wherein said operating coil contains two or more wires with different directions of currents.

46. In a banknote validator as claimed in claim 26 wherein one point of said operating coil is connected to one end of the primary coil of the current transformer.

47. In a banknote validator as claimed in claim 26 wherein one point of said operating coil is connected to one end of the primary coil of the current transformer through the capacitor.

48. In a banknote validator as claimed in claim 26 wherein said induction sensor contains several current transformers, each being connected to an individual operating coil.

49. In a banknote validator as claimed in claim 26 wherein associated with planar induction sensor electronic processing circuitry is mounted on the multilayer printed circuit board of said planar induction sensor.

50. In a banknote validator as claimed in claim 26 wherein several planar induction sensors are incorporated in different locations on one printed circuit board.

51. In a banknote validator as claimed in claim 26 wherein several planar induction sensors with associated electronic circuits are incorporated on one printed circuit board.

* * * * *